US006901258B2

(12) United States Patent
Rajkotia (10) Patent No.: US 6,901,258 B2
(45) Date of Patent: May 31, 2005

(54) SYSTEM AND METHOD FOR AVOIDING TRIANGULATION DELAY IN A TELECOMMUNICATIONS NETWORK (75) Inventor: Purva R. Rajkotia, Plano, TX (US)

(73) Assignee: Samsung Electronics Co., Ltd., Suwon (KR)

(*) Notice: Subject to any disclaimer, the term of this patent is extended or adjusted under 35 U.S.C. 154(b) by 557 days.

(21) Appl. No.: 10/020,632

(22) Filed: Dec. 13, 2001

(65) Prior Publication Data

US 2003/0114161 A1 Jun. 19, 2003

(51) Int. Cl.⁷ ................................................ H04Q 7/20
(52) U.S. Cl. ................ 455/445; 455/432.1; 455/435.1; 370/401
(58) Field of Search ............................ 455/445, 432.1, 455/432.3, 433, 435.1; 370/401, 351, 352, 353

(56) References Cited

U.S. PATENT DOCUMENTS 5,991,621 A  * 11/1999 Alperovich ................. 455/433

2002/0154642 A1  * 10/2002 Hagirahim et al. ......... 370/401

* cited by examiner

Primary Examiner—Lee Nguyen (57) ABSTRACT

For use in a telecommunications network comprising a plurality of packet data service nodes and a plurality of mobile stations, wherein each packet data service node is capable of communicating with one or more mobile stations, there is disclosed an apparatus and method for avoiding triangulation delay that is caused by sending messages over a long network path. The apparatus comprises an interface between the packet data service nodes. Information sent over the interface permits a first packet data service node to send data packets of a message from a first mobile station to a second mobile station directly from the first packet data server node to a second packet data server node without accessing an Internet (IP) protocol network. This avoids triangulation delay by decreasing the length of the network path for the message.

26 Claims, 11 Drawing Sheets

SYSTEM AND METHOD FOR AVOIDING TRIANGULATION DELAY IN A TELECOMMUNICATIONS NETWORK

TECHNICAL FIELD OF THE INVENTION

The present invention is directed, in general, to telecommunications networks and, more specifically, to a system and method for avoiding triangulation delay that is caused by sending messages over a long network path.

BACKGROUND OF THE INVENTION

There are presently over 300 million customers worldwide for cellular telephones and other wireless devices. A significant percentage of these wireless devices are being used as a "data pipe" (i.e., voice traffic is not the primary function). Within the United States, cellular service is offered by cellular service providers, by the regional Bell companies, and by the national long distance operators. The enhanced competition has driven the price of cellular service down to the point where it is affordable to a large segment of the population.

The current generation of cellular phones is used primarily for voice conversations between a subscriber device (or wireless device) and another party through the wireless network. A smaller number of wireless devices are data devices, such as personal digital assistants (PDAs) equipped with cellular/wireless modems. Because the bandwidth for a current generation wireless device is typically limited to a few tens of kilobits per second (Kbps), the applications for the current generation of wireless devices are relatively limited. However, this is expected to change in the next (or third) generation of cellular/wireless technology, sometimes referred to as "3G" wireless/cellular, where much greater bandwidth will be available to each wireless device (i.e., 125 Kbps or greater). The higher data rates will make Internet applications for wireless devices much more common. For instance, a 3G cell phone (or a PC with a 3G cellular modem) may be used to browse web sites on the Internet, to transmit and receive graphics, to execute streaming audio or video applications, and the like. In sum, a much higher percentage of the wireless traffic handled by 3G cellular systems will be Internet protocol (IP) traffic and a lesser percentage will be traditional voice traffic.

Real-time streaming of multimedia content over Internet protocol (IP) networks has become an increasingly common application in recent years. As noted above, 3G wireless networks will provide streaming data (both video and audio) to wireless devices for real time applications. A wide range of interactive and non-interactive multimedia Internet applications, such as news on-demand, live TV viewing, video conferencing, live radio broadcasting (such as Broadcast.com), and the like, will provide "real time" data streaming to wireless devices. Unlike a "downloaded" video file, which may be retrieved first in "non-real" time and viewed or played back later, real time (or streaming) data applications require a data source to encode and to transmit a streaming data signal over a network to a receiver, which must decode and play the signal (video or audio) in real time.

Triangulation delay in a telecommunications network is delay that is caused by having to send a message over a longer network path than would otherwise be necessary. To illustrate the concept of triangulation delay consider an example of a cellular telephone that is capable of sending and receiving Internet protocol (IP) packet based voice and data messages. The home agent for the data packet network of the cellular telephone is located in New York, N.Y. (Site A). Further assume that the user of the cellular telephone (whom we will call "Eric") is temporarily located in Seattle, Wash. (Site B). In presently existing wireless data packet networks the data packets of the call to be delivered to Eric's cellular telephone must first go to Eric's home agent at Site A in New York and then be relayed to Eric at Site B in Seattle. If a friend of Eric's (whom we will call "John") calls Eric from Los Angeles, Calif. (Site C), then the data packets of the call from John will be routed from Site C to Site A and then from Site A to Site B.

The time to send data packets from Site C to Site A and then from Site A to Site B is longer than the time required to send data packets directly from Site C to Site B. The difference in time is referred to as "triangulation delay." The direct connection from Site C to Site B represents one side of a triangle. The indirect connection from Site C to Site B through Site A represents two sides of a triangle. Therefore the direct connection will always require less travel time. The triangulation delay includes time spent at Site A ("overhead time") to redirect the data packets in the call to Site B. Triangulation delay lessens the efficiency of the network.

The volume of telecommunications network traffic is projected to grow significantly. It is estimated that there will be approximately five hundred million (500,000,000) IP addresses in existence by the year 2005 (thirty percent (30%) of an estimated 1.65 billion users) and that there will be one billion (1,000,000,000) IP addresses in existence by the year 2010. As the volume of network traffic continues to grow, triangulation delays will also continue to increase. At some point the reduced efficiency of the network caused by triangulation delays will become significant.

There is therefore a need in the art for an improved telecommunications network that is capable of avoiding triangulation delay. In particular, there is a need for an improved system and method that routes network traffic in a manner to avoid triangulation delay.

SUMMARY OF THE INVENTION

It is a primary objective of the present invention to provide an apparatus and method for avoiding triangulation delay in a telecommunications network.

The apparatus and method of the present invention is designed for use in a telecommunications network comprising a plurality of packet data service nodes and a plurality of mobile stations, wherein each packet data service node is capable of communicating with one or more mobile stations.

The apparatus of the present invention comprises an interface between each of the packet data service nodes within the telecommunications network. The interface permits the packet data service nodes to communicate directly with each other without accessing an Internet (IP) protocol network. For example, whenever the value of any parameter stored within a first packet data service nodes changes, that first packet data service nodes sends the changed value of the parameter (in a message referred to as an "IP Push Message") directly to each of the other packet data service nodes in the network. Information transferred through the interface of the present invention permits a first packet data service node to send data packets of a message from a first mobile station to a second mobile station directly from the first packet data service server node to a second packet data server node without accessing an Internet (IP) protocol network. This avoids triangulation delay by decreasing the length of the network path for the message.

An alternate advantageous embodiment of apparatus of the present invention for avoiding triangulation delay comprises a data base coupled to each of the packet data service nodes. The data base is capable of sending data packets of a message from a first mobile station to a second mobile station directly from a first packet data server node to a second packet data server node without accessing an Internet (IP) protocol network. This avoids triangulation delay by decreasing the length of the network path for the message.

It is an object of the present invention to provide an apparatus and method for routing telecommunications network traffic in a manner to avoid triangulation delay.

It is also an object of the present invention to provide an interface between two packet data service nodes in a data packet telecommunications network.

It is another object of the present invention to provide an interface that directly connects each pair of packet data service nodes in a data packet telecommunications network.

It is another object of the present invention to reduce latency time for data packets to travel through a data packet telecommunications network.

It is yet another object of the present invention to reduce overhead time within a telecommunications network.

It is still another object of the present invention to insure that the security of information on a telecommunications network is not affected when the apparatus and method of the present invention operate to avoid triangulation delay in the telecommunications network.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 11, discussed below, and the various embodiments used to describe the principles of the present invention in this patent document are by way of illustration only and should not be construed in any way to limit the scope of the invention. The principles of the present invention will be illustrated using a wireless telecommunications network. However, those skilled in the art will understand that the principles of the present invention may be implemented in any suitably arranged telecommunications network.

Figure 1:
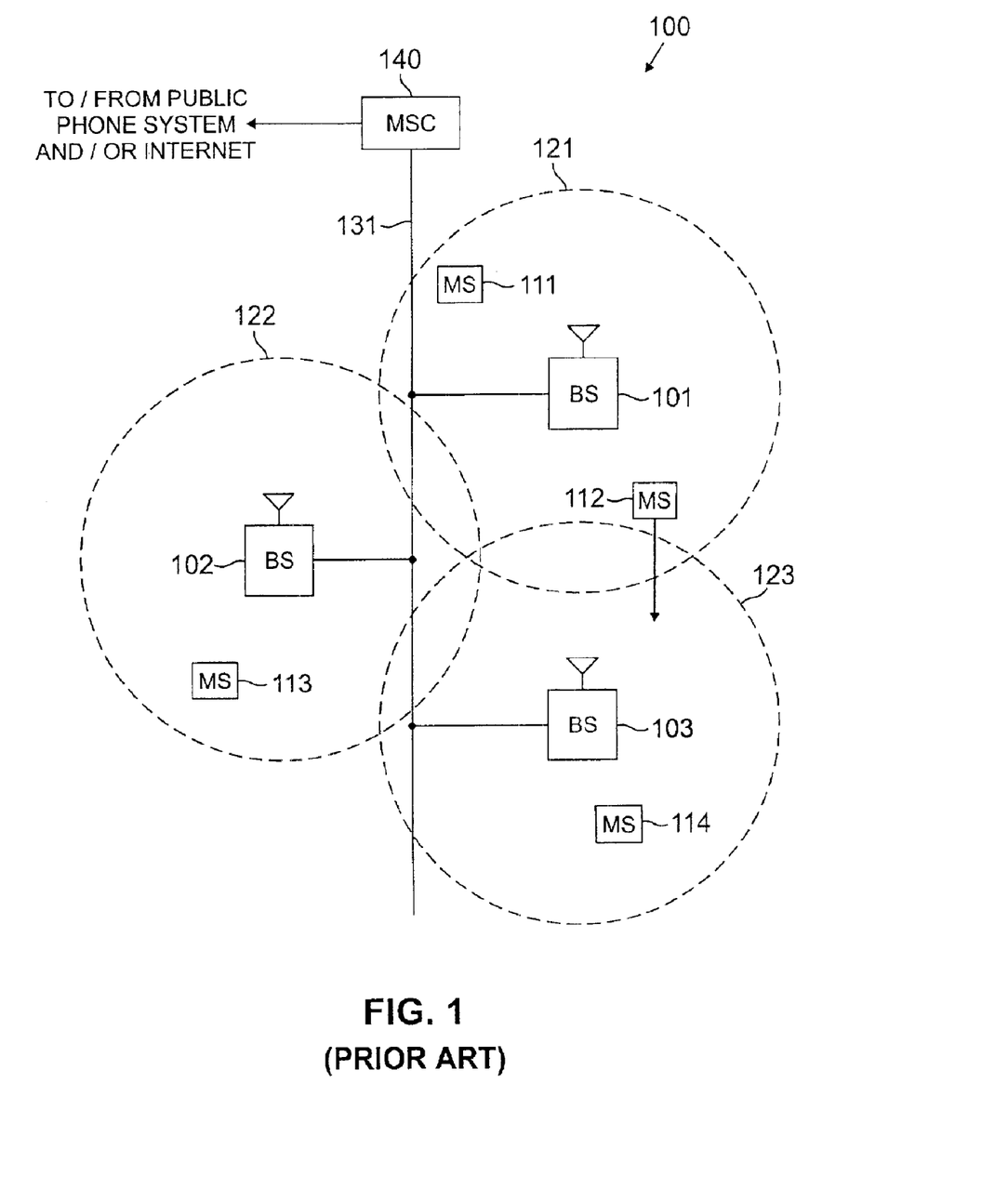
FIG. 1 illustrates an exemplary prior art wireless network.

FIG. 1 illustrates a general overview of an exemplary wireless network 100. The wireless telephone network 100 comprises a plurality of cell sites 121–123, each containing one of the base stations, BS 101, BS 102, or BS 103. Base stations 101–103 are operable to communicate with a plurality of mobile stations (MS) 111–114. Mobile stations 111–114 may be any suitable wireless communication devices, including conventional cellular telephones, PCS handsets, portable computers, telemetry devices, and the like, which are capable of communicating with the base stations via wireless links.

Dotted lines show the approximate boundaries of the cell sites 121–123 in which base stations 101–103 are located. The cell sites are shown approximately circular for the purposes of illustration and explanation only. It should be clearly understood that the cell sites also may have irregular shapes, depending on the cell configuration selected and natural and man-made obstructions.

Each of the base stations BS 101, BS 102, and BS 103 may comprise a base station controller (BSC) and a base transceiver station (BTS). Base station controllers and base transceiver stations are well known to those skilled in the art. A base station controller is a device that manages wireless communications resources, including the base transceiver station, for specified cells within a wireless communications network. A base transceiver station comprises the RF transceivers, antennas, and other electrical equipment located in each cell site. This equipment may include air conditioning units, heating units, electrical supplies, telephone line interfaces, and RF transmitters and RF receivers, as well as call processing circuitry. For the purpose of simplicity and clarity in explaining the operation of the present invention, the base transceiver station in each of cells 121, 122, and 123 and the base station controller associated with each base transceiver station are collectively represented by BS 101, BS 102 and BS 103, respectively.

BS 101, BS 102 and BS 103 transfer voice and data signals between each other and the public telephone system (not shown) via communications line 131 and mobile switching center (MSC) 140. Mobile switching center 140 is well known to those skilled in the art. Mobile switching center 140 is a switching device that provides services and coordination between the subscribers in a wireless network and external networks, such as the public telephone system and/or the Internet. Communications line 131 may be any suitable connection means, including a T1 line, a T3 line, a fiber optic link, a network backbone connection, and the like. In some embodiments, communications line 131 may be several different data links, where each data link couples one of BS 101, BS 102, or BS 103 to MSC 140.

In the exemplary wireless network 100, MS 111 is located in cell site 121 and is in communication with BS 101, MS 113 is located in cell site 122 and is in communication with BS 102, and MS 114 is located in cell site 123 and is in communication with BS 103. MS 112 is also located in cell site 121, close to the edge of cell site 123. The direction arrow proximate MS 112 indicates the movement of MS 112 towards cell site 123. At some point, as MS 112 moves into cell site 123 and out of cell site 121, a "handoff" will occur.

As is well known, a handoff transfers control of a call from a first cell to a second cell. For example, if MS 112 is in communication with BS 101 and senses that the signal from BS 101 is becoming unacceptably weak, MS 112 may then switch to a base station that has a stronger signal, such as the signal transmitted by BS 103. MS 112 and BS 103 establish a new communication link and a signal is sent to BS 101 and the public telephone network to transfer the on-going voice, data, or control signals through BS 103. The call is thereby seamlessly transferred from BS 101 to BS 103. An "idle" handoff is a handoff between cells of a mobile device that is communicating in the control or paging channel, rather than transmitting voice and/or data signals in the regular traffic channels.

One or more of the wireless devices in wireless network 100 may be capable of executing real time applications, such as streaming audio or streaming video applications. Wireless network 100 receives the real time data from, for example, the Internet and transmits it in the forward channel to the wireless device. For example, MS 112 may comprise a 3G cellular phone device that is capable of surfing the Internet and listening to streaming audio, such as music from the web site "www.mp3.com " or a sports radio broadcast from the web site "www.broadcast.com." MS 112 may also view streaming video from a news web site, such as "www.CNN.com." To avoid increasing the memory requirements and the size of wireless phone devices, one or more of the base stations in wireless network 100 provide real time data buffers that can be used to buffer real time data being sent to, for example, MS 112.

Figure 2:
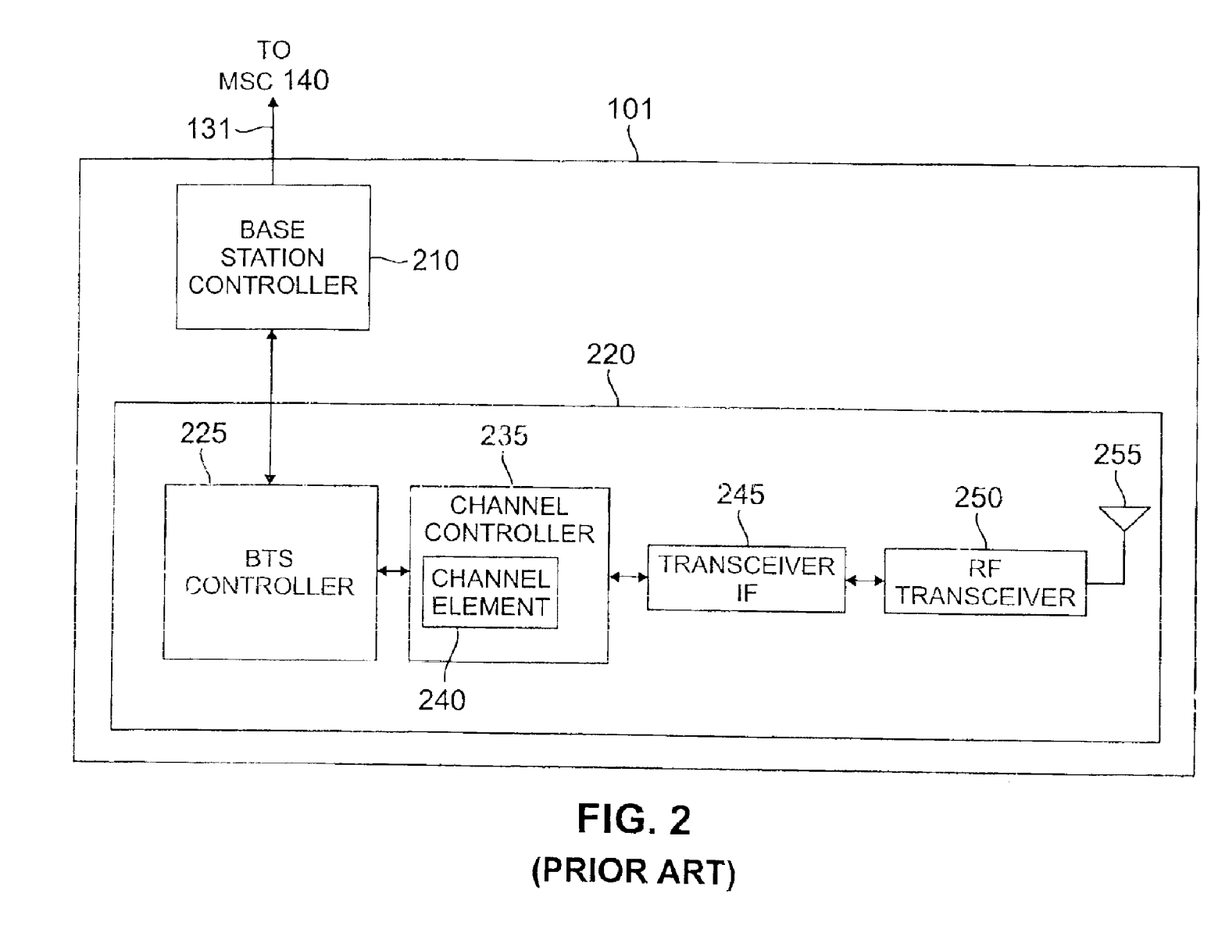
FIG. 2 illustrates an exemplary prior art base station of the exemplary prior art wireless network shown in FIG. 1.

FIG. 2 illustrates in greater detail exemplary base station 101. Base station 101 comprises base station controller (BSC) 210 and base transceiver station (BTS) 220. Base station controllers and base transceiver stations were described previously in connection with FIG. 1. BSC 210 manages the resources in cell site 121, including BTS 220. BTS 220 comprises BTS controller 225, channel controller 235 with representative channel element 240, transceiver interface (IF) 245, RF transceiver unit 250, and antenna array 255.

BTS controller 225 comprises processing circuitry and memory capable of executing an operating program that controls the overall operation of BTS 220 and communicates with BSC 210. Under normal conditions, BTS controller 225 directs the operation of channel controller 235, which contains a number of channel elements, including channel element 240, that perform bi-directional communications in the forward channel and the reverse channel. A "forward" channel refers to outbound signals from the base station to the mobile station and a "reverse" channel refers to inbound signals from the mobile station to the base station. Transceiver IF 245 transfers the bidirectional channel signals between channel controller 235 and RF transceiver unit 250.

Antenna array 255 transmits forward channel signals received from RF transceiver unit 250 to mobile stations in the coverage area of BS 101. Antenna array 255 also sends to transceiver 250 reverse channel signals received from mobile stations in the coverage area of BS 101. In one embodiment, antenna array 255 may comprise a multi-sector antenna, such as a three sector antenna in which each antenna sector is responsible for transmitting and receiving in a one hundred twenty degree (120°) arc of coverage area. Additionally, RF transceiver 250 may contain an antenna selection unit to select among different antennas in antenna array 255 during both transmit and receive operations.

For the purpose of illustration, assume that a user of mobile station 111 wishes to make a call to another mobile station that is not part of the home access provider network of mobile station 111. The call could be a voice call from a cellular telephone or a data call from a wireless device capable of transmitting and receiving data packets. The call from mobile station 111 must be routed to the home access provider network of the mobile station to be called.

Figure 3:
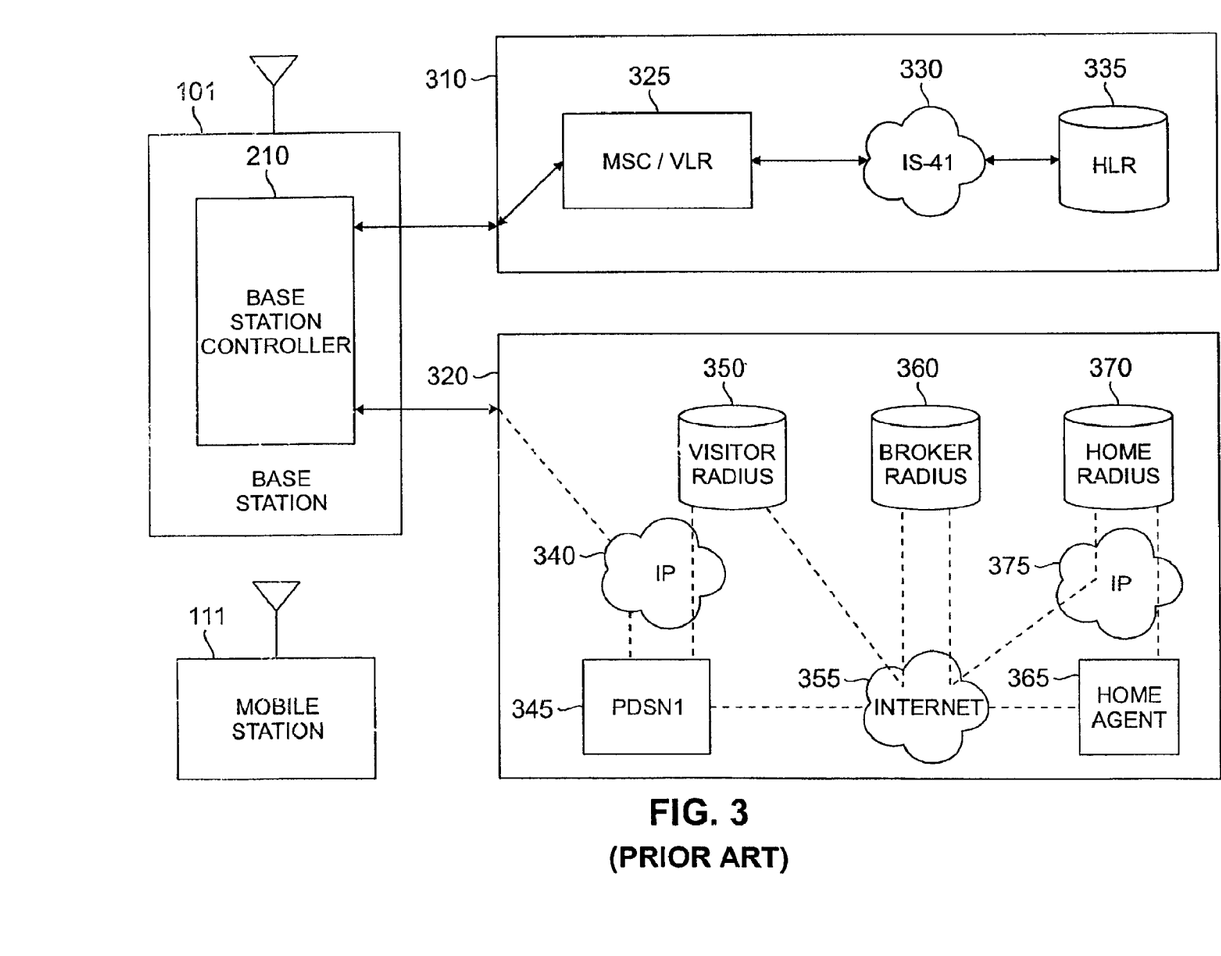
FIG. 3 illustrates a base station controller in a base station coupled to a prior art voice network and coupled to a prior art Internet protocol (IP) network.

FIG. 3 illustrates a base station controller 210 in a base station 101 coupled to a prior art voice network 310 and coupled to a prior art Internet protocol (IP) network 320. Mobile station 111 makes a call by first sending the call to base station 101.

If the call from mobile station 111 is a voice call, then base station controller 210 within base station 101 routes the call to voice network 310. The voice call goes to mobile switching center (MSC) 325 for registration. Mobile switching center (MSC) 325 contains a visitor location register (VLR). The voice call is routed through IS-41 network 330 to a home location register (HLR) 335.

If the call from mobile station 111 is a data call, then base station controller 210 within base station 101 routes the call to IP (Internet Protocol) network 320. The data call goes to IP network 340 and then to a packet data service node 345. Packet data service node 345 is denoted PDSN1 in FIG. 3. The call is routed through Internet 355 to IP network 375 and home agent 365. Visitor radius database 350 is coupled to PDSN1 345 and Internet 355. Broker radius database 360 is coupled to Internet 355. Home radius database 370 is coupled to IP network 375 and home agent 365.

Figure 4:
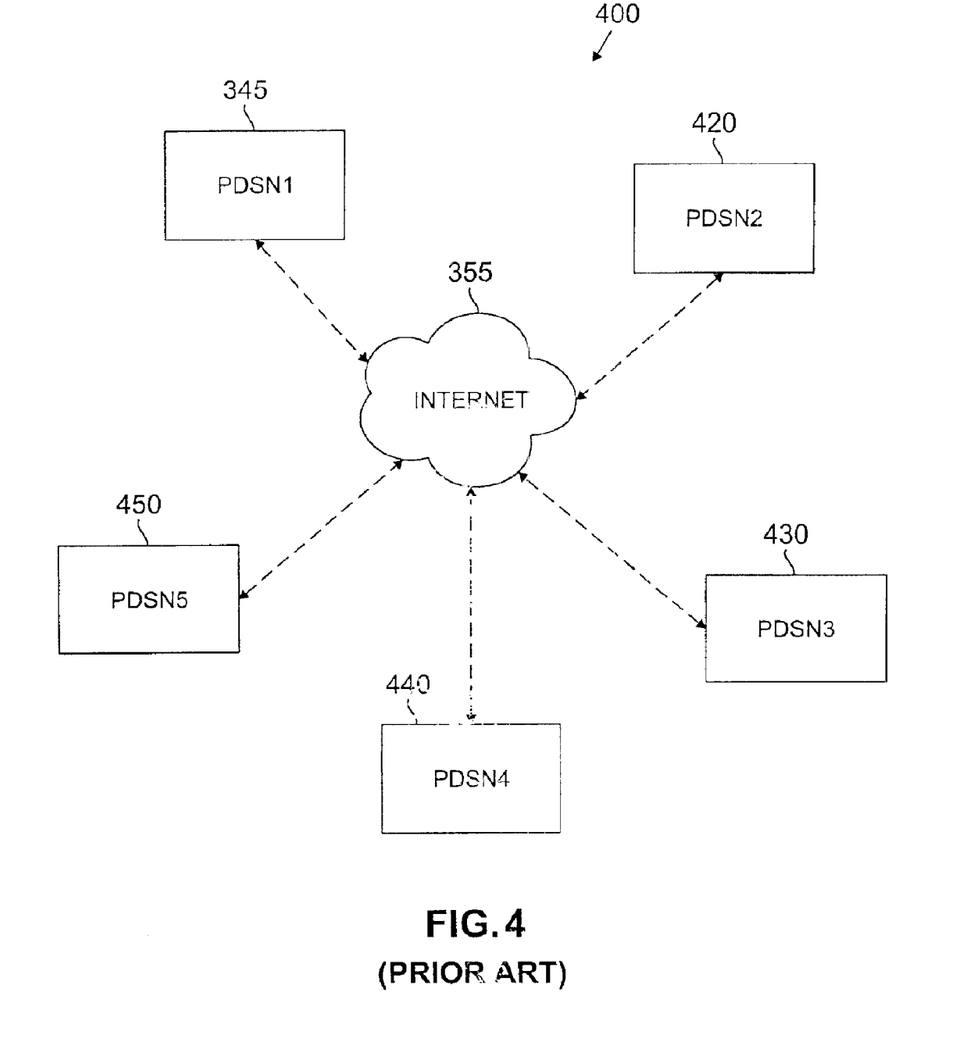
FIG. 4 illustrates an exemplary prior art network architecture showing a plurality of packet data service nodes coupled to the Internet.

FIG. 4 illustrates an exemplary prior art network architecture showing a plurality of packet data server nodes (PDSNs) coupled to the Internet 355. PDSN1 345, PDSN2 420, PDSN3 430, PDSN4 440, and PDSN5 450 are directly coupled to the Internet 355. Any communication between packet data service nodes must go through Internet 355. That is, there is no direct communication between the packet data service nodes.

Figure 5:
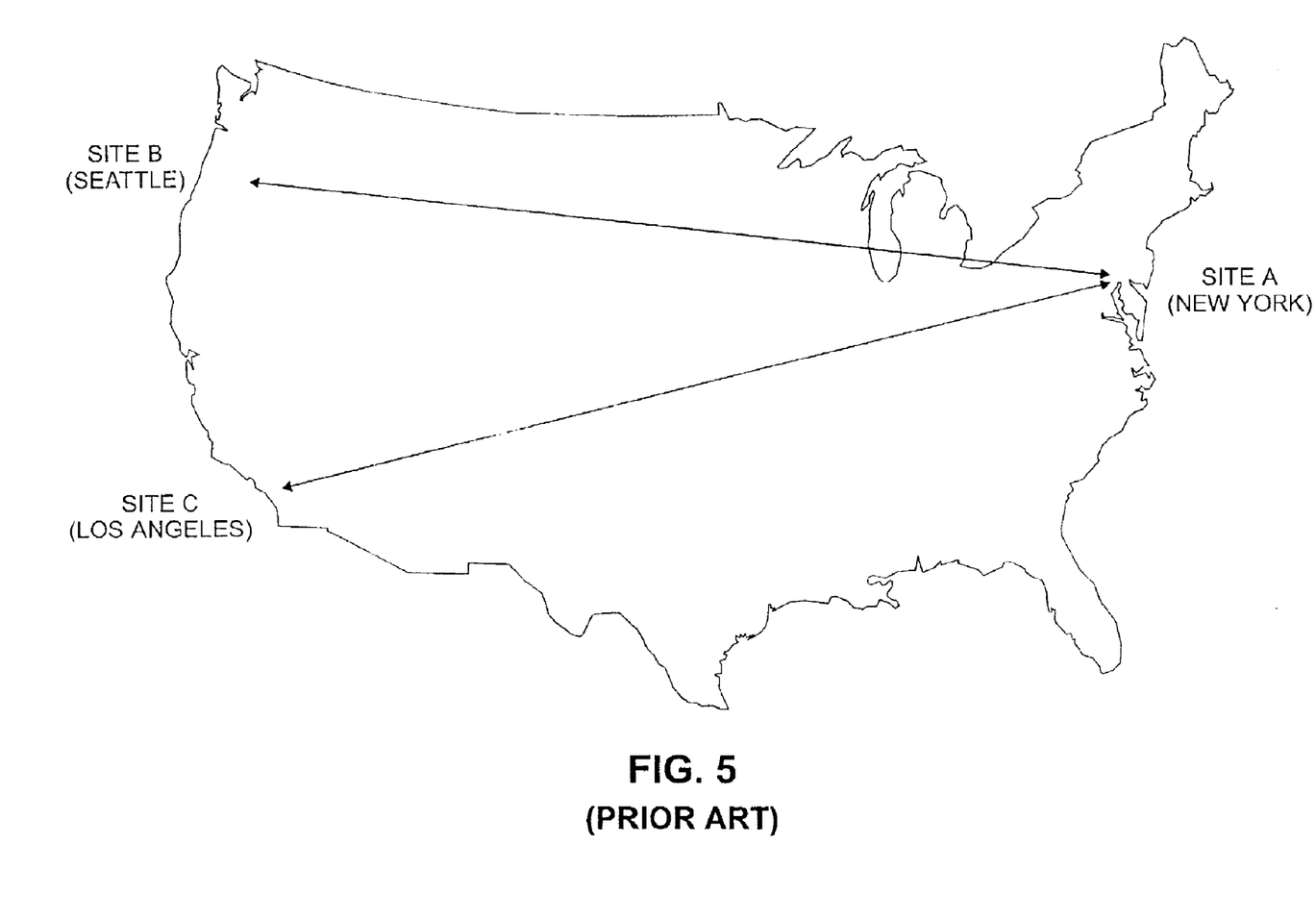
FIG. 5 illustrates a prior art telecommunications path illustrating the concept of triangulation delay.

FIG. 5 illustrates a prior art telecommunications path illustrating the concept of triangulation delay. Assume that mobile station 111 (shown in FIG. 3) is a cellular telephone capable of sending and receiving Internet protocol (IP) packet based voice and data messages. The home network of mobile station 111 is located in New York, N.Y. (Site A). Further assume that the user of mobile station 111 (whom we will call "Eric") is temporarily located in Seattle, Wash. (Site B). In presently existing telecommunications networks the data packets of the call to be delivered to mobile station 111 must first go to Eric's home agent at Site A in New York and then be relayed to Eric at Site B in Seattle. If a friend of Eric's (whom we will call "John") calls Eric from Los Angeles, Calif. (Site C), then the call from John will be routed from Site C to Site A and then from Site A to Site B.

The time to send a call from Site C to Site A and then from Site A to Site B is longer than the time required to send a call directly from Site C to Site B. The difference in time is referred to as "triangulation delay." The direct connection from Site C to Site B represents one side of a triangle. The indirect connection from Site C to Site B through Site A represents two sides of a triangle. Therefore the direct connection will always require less travel time. The triangulation delay includes time spent at Site A ("overhead time") to redirect the data in the call to Site B. Triangulation delay lessens the efficiency of the network.

As the volume of network traffic continues to grow, the amount of triangulation delay in the network will also continue to increase. The volume of telecommunications network traffic is projected to grow significantly. It is estimated that there will be approximately five hundred million (500,000,000) IP addresses in existence by the year 2005 (thirty percent (30%) of an estimated 1.65 billion users) and that there will be one billion (1,000,000,000) IP addresses in existence by the year 2010.

Assume that in the year 2005 one percent (1.0%) of the users are roaming (i.e., traveling outside of their home network). That will mean that approximately five million (5,000,000) users will be contributing to triangulation delay by the year 2005. The number of users contributing to triangulation delay would be approximately ten million (10,000,000) by the year 2010. This will create significant network congestion and introduce significant latency for the subscribers of the network.

Figure 6:
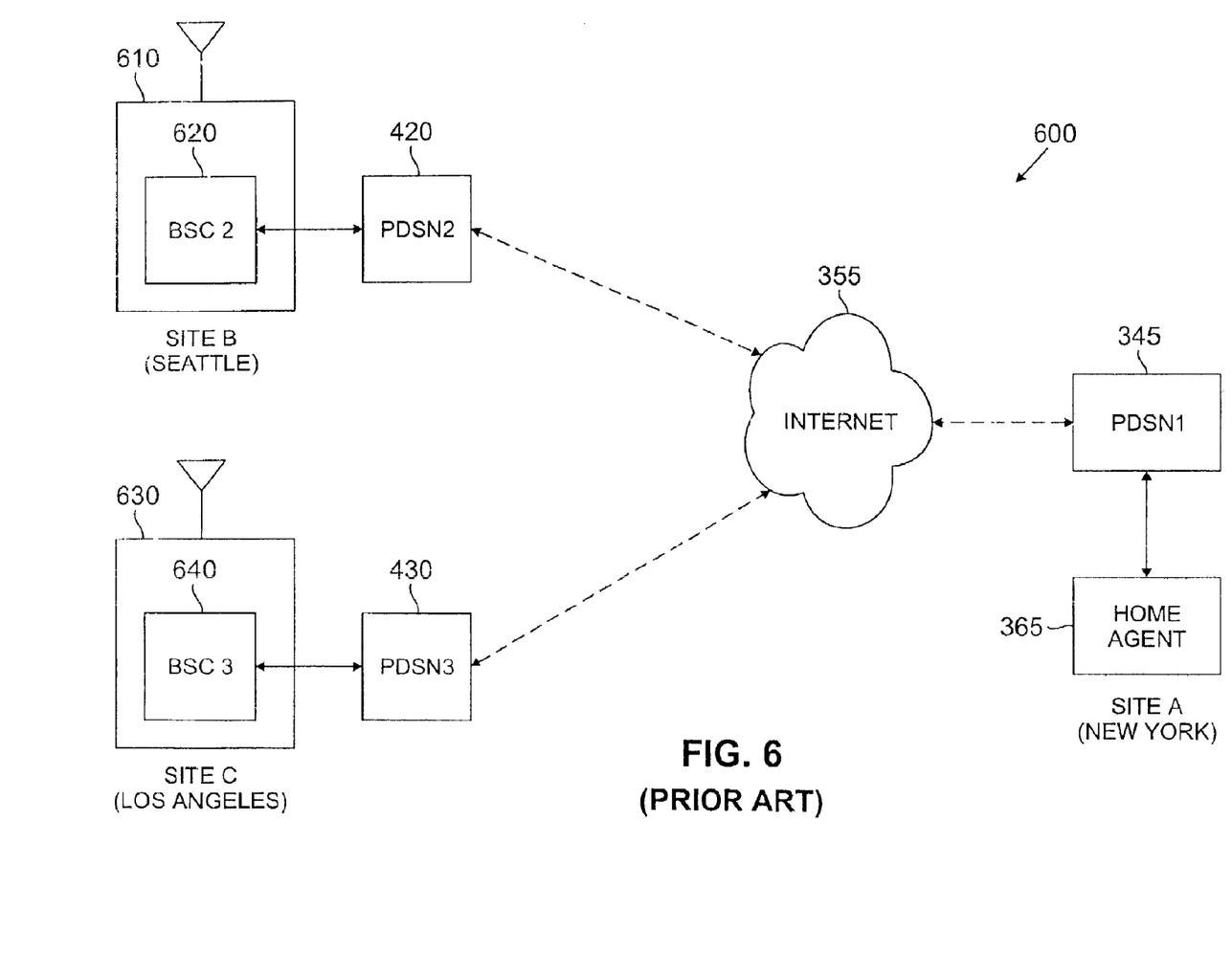
FIG. 6 illustrates an exemplary prior art network architecture showing how a network message is processed in a manner that results in the creation of triangulation delay.

FIG. 6 illustrates how a presently existing prior art network architecture 600 would route John's call from Site C in Los Angeles to Eric at Site B in Seattle. John's mobile station (not shown in FIG. 6) sends a call to its local base station 630. The call is forwarded by base station controller 640 (denoted BSC3) in base station 630 to PDSN3 430. Then PDSN3 430 forwards the call to Internet 355 and to PDSN1 345 at Site A in New York. Home agent 365 locates Eric at Site B in Seattle. PDSN1 345 then forwards all of the packet data of the call back through Internet 355 to PDSN2 420 at Site B in Seattle. The data is delivered to base station by controller 620 (denoted BSC2) and base station 610 delivers the data to Eric's mobile station (not shown in FIG. 6). Triangulation delay results from routing all of the packet data of the call through Site A in New York.

Figure 7:
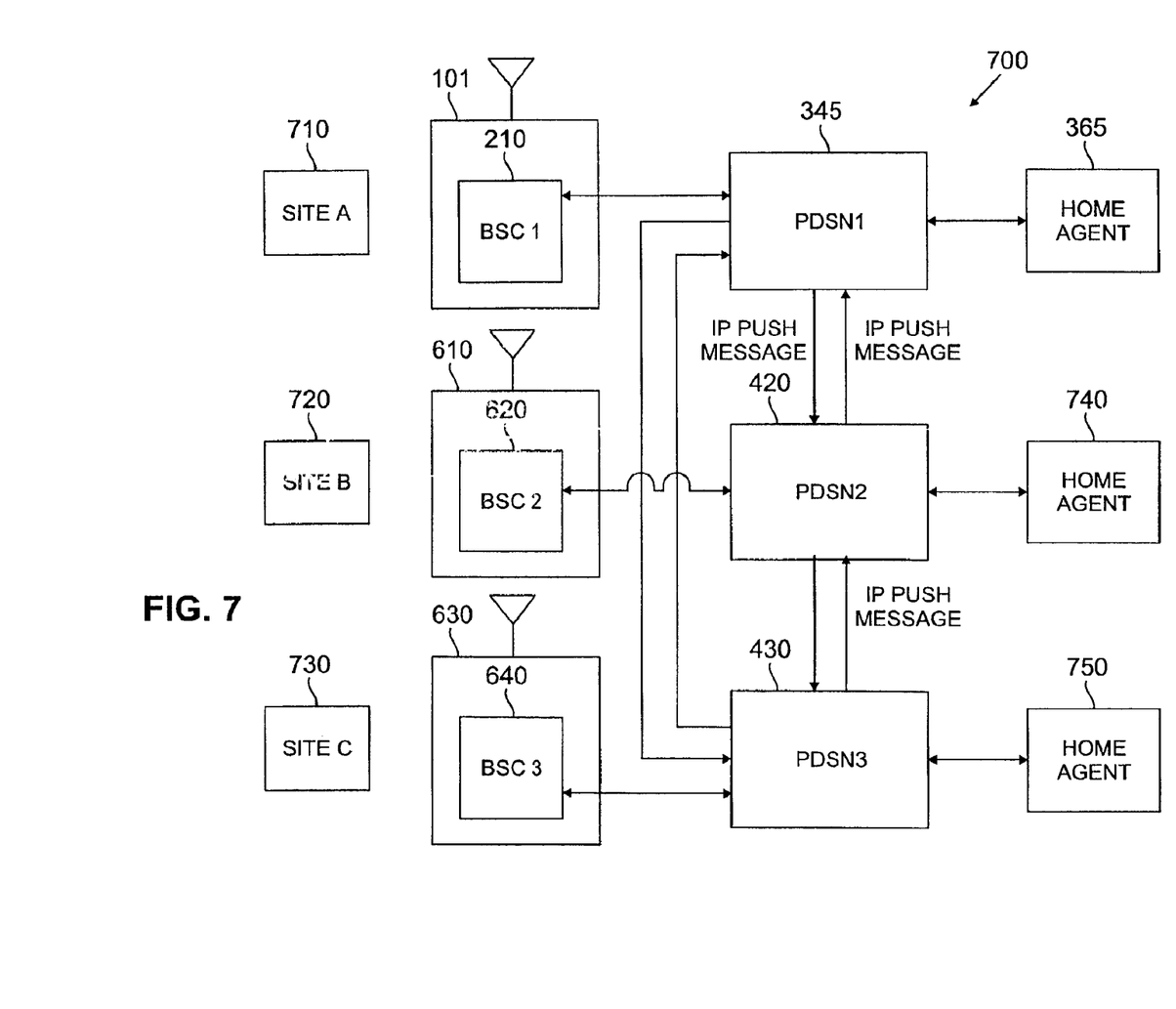
FIG. 7 illustrates an exemplary network architecture of the present invention showing how a network message may be processed in a manner that avoids the creation of triangulation delay.

FIG. 7 illustrates a network architecture 700 in accordance with the principles of the present invention. In network architecture 700 each packet data server node in the network is directly coupled to each of the other packet data server nodes through a packet data service node interface. Each packet data server node is capable of communicating directly with each other packet data server node through the packet data service node interface without going through the Internet 355. As shown in FIG. 7, PDSN1 345 (coupled to home agent 365) is coupled to PDSN2 420 and to PDSN3 430. PDSN2 420 (coupled to home agent 740) is coupled to PDSN1 345 and to PDSN3 430. PDSN3 430 (coupled to home agent 750) is coupled to PDSN1 345 and PDSN2 420.

Each packet data server node is capable of sending a message (referred to as an IP Push Message) through the packet data service node interface to the other packet data server nodes in network 700. Assume that mobile station 111 leaves the area served by its home network service provider (served by PDSN1 345) and enters a new area (served by PDSN2 420). When mobile station 111 makes a call in the new area or otherwise reports its position in the new area, then PDSN2 420 identifies mobile station 111 and sends a message (referred to as an IP Push Message) via the packet data service node interface to all of the other packet data service nodes in the network advising that mobile station 111 is now located in the area served by PDSN2 420. Any calls to mobile station 111 may now be routed directly to PDSN2 420 and need not go through PDSN1 345.

The IP Push Message contains the identification of the new base station controller, the identification of the new base transceiver station, the mobile IP address, the NID (Network Interface Device), the SID (System Identification Number), and a time stamp. Any updates to the IP Push Message due to the mobile station's subsequent movements only need to include the changed information and a time stamp. This feature reduces the amount of overhead required for updating the network communication information.

FIG. 7 also shows how network architecture 700 of the present invention would route John's call from Site C 730 in Los Angeles to Eric at Site B 720 in Seattle. John's mobile station (not shown in FIG. 7) sends a call to its local base station 630. The call is forwarded by base station controller 640 (denoted BSC3) in base station 630 to PDSN3 430. PDSN3 430 does not forward the call to Internet 355. Instead PDSN3 430 communicates directly with PDSN1 345 and PDSN2 420 to find the packet data server node in network 700 where Eric's mobile station 111 is currently located. PDSN3 430 locates Eric's mobile station 111 at Site B 720 in Seattle. PDSN3 430 then forwards all of the data packets of John's call directly to PDSN2 420 at Site B 720 in Seattle. The data packets are delivered to base station controller 620 (denoted BSC2) and base station 610 delivers the data packets to Eric's mobile station (not shown in FIG. 7) at Site B 720 in Seattle. Unlike prior art systems, it is not necessary to send the data packets to PDSN1 345 at Site A 710 in New York.

The network architecture of the present invention provides numerous advantages. Triangulation delay in the network is avoided. Latency time for the data packets to travel through the network is reduced. The overhead time in the network is reduced. The security of information transmitted to and from a mobile station in the network architecture of the present invention will not be affected. Authentication, encryption, and firewall traversal are not affected by the network architecture of the present invention. The network architecture of the present invention is independent of the radio access technology used for the wireless interface.

Figure 8:
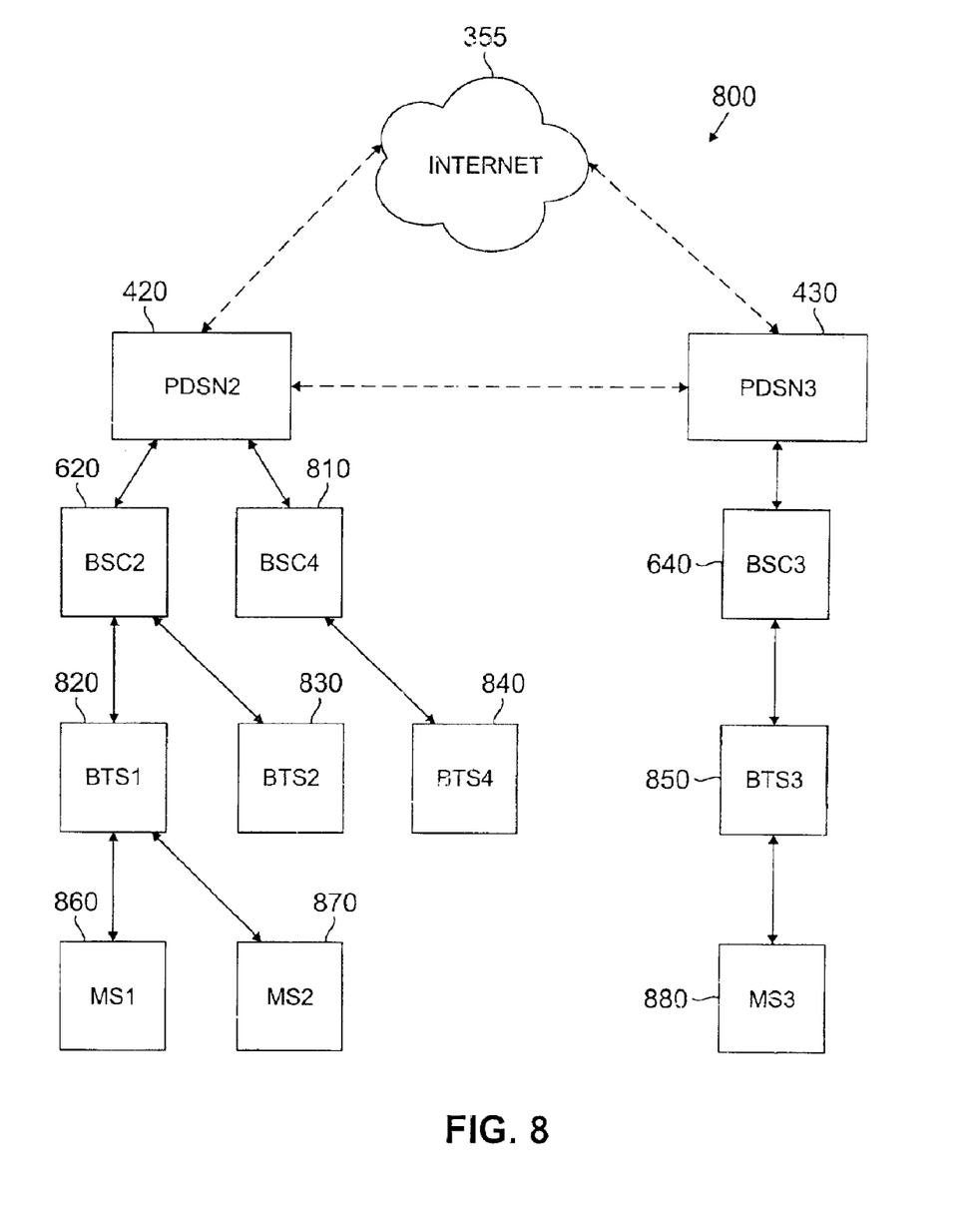
FIG. 8 illustrates another exemplary network architecture of the present invention showing how network messages may be processed in a manner that avoids the creation of triangulation delay.

FIG. 8 illustrates an alternative example of how data packets may be sent over a network architecture of the present invention. Network architecture 800 comprises PDSN2 420 and PDSN3 430 each coupled to Internet 355. As shown in FIG. 8, PDSN2 420 and PDSN3 430 are directly coupled to each other through a packet data service node interface of the present invention.

PDSN2 420 is coupled to two base station controllers, BSC2 620 and BSC4 810. Base station controller BSC2 620 is coupled to two base transceiver stations, BTS1 820 and BTS2 830. Base station controller BSC4 810 is coupled to one base transceiver station, BTS4 840. Base transceiver station BTS1 820 is coupled to two mobile stations, MS1 860 and MS2 870.

PDSN3 430 is coupled to one base station controller BSC3 640. Base station controller BSC3 640 is coupled to one base transceiver station BTS3 850. Base transceiver station BTS3 850 is coupled to one mobile station MS3 880.

FIG. 8 illustrates that (1) one packet data server node can serve more than one base station controller, and (2) one base station controller can serve more than one base transceiver station, and (3) a base transceiver station can serve more than one mobile station. For example, in one advantageous embodiment, one packet data server node can serve, say, ten (10) base station controllers and each of these base station controllers could serve, say, thirty (30) base transceiver stations. Each of the base transceiver stations could also serve a plurality of mobile stations.

Assume that the user of mobile station MS1 860 sends a message to mobile station MS2 870. The data path would be from MS1 860 to base transceiver station BTS1 820 to base station controller BSC2 620 to packet data server node PDSN2 420. In a prior art telecommunications network PDSN2 420 would go out to the Internet 355 and then to the home agent of MS2 870 to find the location of MS2 870. The data path would then go from PDSN2 420 to Internet 355 and back from Internet 355 to PDSN2 420 and then to MS2 870 even though MS2 870 is being served by base transceiver station BTS1 820.

In the present invention PDSN2 420 accesses its own internal data base and finds that PDSN2 420 itself is serving MS2 870. Then PDSN2 420 does not have to go out to the Internet 355. The data path comes right back down from PDSN2 420 to MS2 870. This approach avoids triangulation delay in the manner previously described.

Now assume that the user of mobile station MS1 860 sends a message to mobile station MS3 880. The data path would be from MS1 860 to base transceiver station BTS1 820 to base station controller BSC2 620 to packet data server node PDSN2 420. In a prior art telecommunications network PDSN2 420 would go out to the Internet 355 and then to the home agent of MS3 880 to find the location of MS3 880. PDSN2 420 would find that MS3 880 is being served by PDSN3 430. The data path would then go from PDSN2 420 to Internet 355 to the home network of MS3 880 and back through Internet 355 to PDSN3 430 and then to MS3 880.

In the present invention PDSN2 420 accesses its internal data base and finds that PDSN3 430 is serving MS3 880. PDSN2 420 previously received this information in an IP Push Message from PDSN3 430 through the packet data service node interface of the present invention. Then PDSN2 420 does not have to go out to the Internet 355. The data path goes directly from PDSN2 420 to PDSN3 430 and then on to MS3 880. This approach avoids triangulation delay in the manner previously described.

Figure 9:
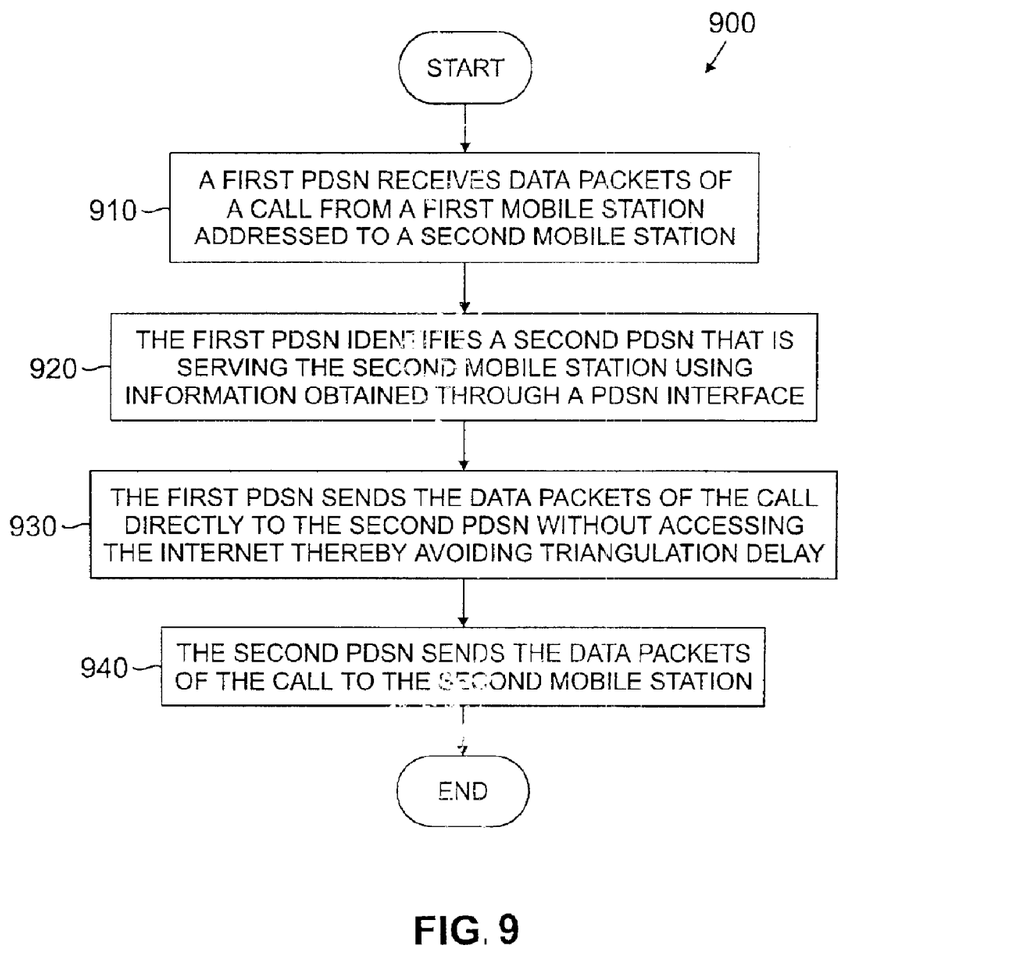
FIG. 9 is a flow chart illustrating the operation of an advantageous embodiment of a method of the invention for avoiding triangulation delay in a telecommunications network.

FIG. 9 depicts flow chart that illustrates a method of operation of the present invention for avoiding triangulation delay according to one advantageous embodiment of the present invention. The steps of the method are generally denoted with the reference numeral 900. A first packet data server node PDSN2 420 receives data packets of a call from a first mobile station MS1 960 addressed to a second mobile station MS3 980 (step 910). The first packet data server node PDSN2 420 identifies a second packet data server node PDSN3 430 that is serving the second mobile station MS3 980 using information obtained from PDSN3 430 through a packet data service node interface (step 920). The first packet data server node PDSN2 420 sends the data packets of the call directly to the second packet data server node PDSN3 430 without accessing the Internet 355 thereby avoiding triangulation delay (step 930). The second packet data server node PDSN3 430 sends the data packets of the call to the second mobile station MS3 880 (step 940).

Figure 10:
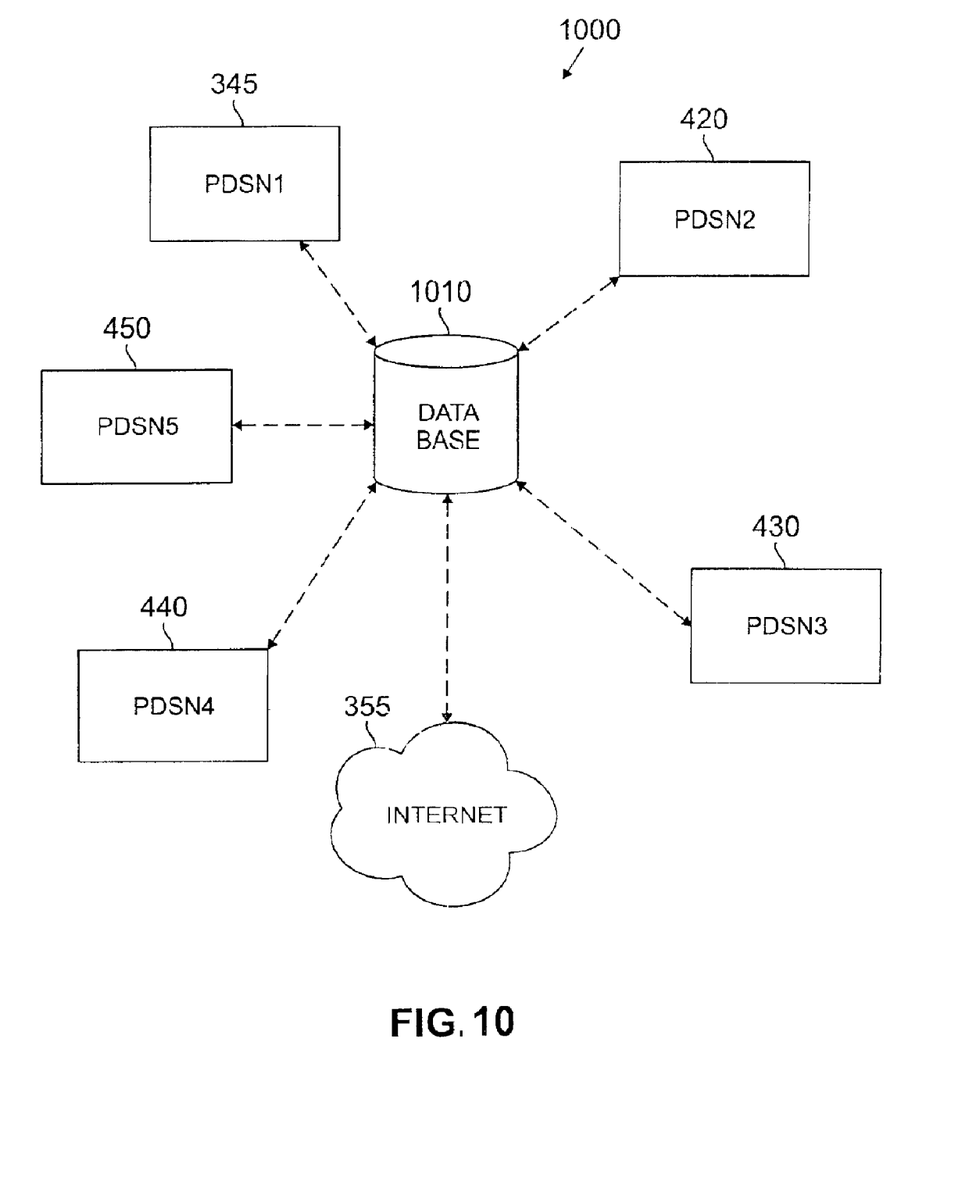
FIG. 10 illustrates an alternate advantageous embodiment of the network architecture of the present invention showing a plurality of packet data service nodes coupled to a data base that is coupled to the Internet.

FIG. 10 shows the interconnection of the packet data server nodes in an alternate advantageous embodiment of the present invention. Network 1000 comprises a plurality of packet data server nodes, PDSN1 345, PDSN2 420, PDSN3 430, PDSN4 440, and PDSN450 and data base 1010. Each packet data server node in network 1000 is coupled directly to data base 1010. Data base 1010 allows the packet data server nodes in network 1000 to communicate directly with each other without going through Internet 355. Data base 1010 is coupled directly to Internet 355 and provides Internet access for each packet data server node.

Each packet data server node is capable of sending messages to the other packet data server nodes in network 1000. Assume that mobile station 111 leaves the area served by its home network service provider (served by PDSN1 345) and enters a new area (served by PDSN2 420). When mobile station 111 makes a call in the new area or otherwise reports its position in the new area, then PDSN2 420 identifies mobile station 111 and sends a message (referred to as an IP Push Message) via data base 1010 to all of the other packet data service nodes in the network advising that mobile station 111 is now located in the area served by PDSN2 420. Any calls to mobile station 111 may now be routed directly to PDSN2 420 and need not go through PDSN1 345.

Figure 11:
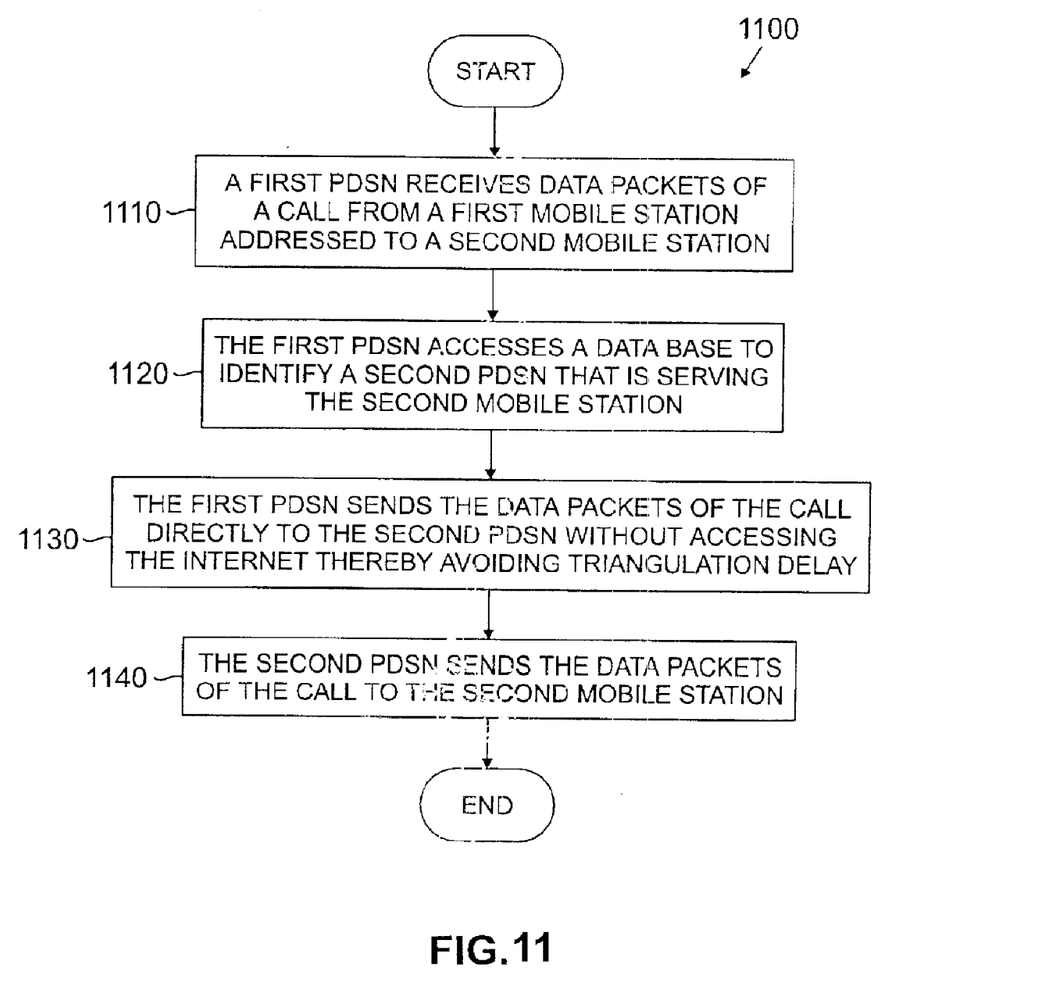
FIG. 11 is a flow chart illustrating the operation of an alternate advantageous embodiment of a method of the invention for avoiding triangulation delay in a telecommunications network.

FIG. 11 depicts flow chart that illustrates a method of operation of the present invention for avoiding triangulation delay according to an alternative advantageous embodiment of the present invention. The steps of the method are generally denoted with the reference numeral 1100. A first packet data server node PDSN2 420 receives data packets of a call from a first mobile station MS1 860 addressed to a second mobile station MS3 880 (step 1110). The first packet data server node PDSN2 420 accesses a data base 1010 to identify a second packet data server node PDSN3 430 that is serving the second mobile station MS3 880 (step 1120). The first packet data server node PDSN2 420 sends the data packets of the call directly to the second packet data server node PDSN3 430 without accessing the Internet 355 thereby avoiding triangulation delay (step 1130). The second packet data server node PDSN3 430 sends the data packets of the call to the second mobile station MS3 880 (step 1140).

Although the present invention has been described in detail, those skilled in the art should understand that they can make various changes, substitutions and alterations herein without departing from the spirit and scope of the invention in its broadest form.

What is claimed is:

1. For use in a telecommunications network comprising a plurality of packet data service nodes and a plurality of mobile stations, wherein each packet data service node in said plurality of packet data service nodes is capable of communicating with at least one mobile station, an apparatus for avoiding triangulation delay when a first mobile station sends data packets to a second mobile station, said apparatus comprising:

an interface connecting a first packet data service node that serves said first mobile station and a second packet data service node that serves said second mobile station, said interface enabling said second packet data service node to send an Internet protocol push message comprising information concerning said second mobile station to said first packet data service node.

2. The apparatus as set forth in claim 1 wherein said Internet protocol push message comprises one of: an identification of a base station controller, an identification of a base transceiver station, a mobile Internet protocol address, a Network Interface device, a System Identification Number, and a time stamp.

3. The apparatus as set forth in claim 1 wherein said Internet protocol push message comprises an updated Internet protocol push message that comprises a time stamp and one of: an identification of a new base station controller, an identification of a new base transceiver station, a new mobile Internet protocol address, a new Network Interface Device, and a new System Identification Number.

4. The apparatus as set forth in claim 1 wherein said first packet data service node is capable of avoiding triangulation delay by sending data packets from said first mobile station directly to said second packet data service node for delivery to said second mobile station based on information received from said second mobile packet data service node through said interface.

5. The apparatus as set forth in claim 4 wherein said first packet data service node is capable of avoiding triangulation delay by sending data packets from said first mobile station directly to said second packet data service node for delivery to said second mobile station without sending said data packets through an Internet protocol network.

6. The apparatus as set forth in claim 1 further comprising an interface connecting each packet data service node in said plurality of packet data service nodes with all other packet data service nodes in said plurality of packet data service nodes, said interface enabling said each packet data service node to obtain information from all other packet data service nodes concerning mobile stations served by said packet data service nodes.

7. The apparatus as set forth in claim 6 wherein said interface enables each packet data service node to send an Internet protocol push message to all other packet data service nodes.

8. The apparatus as set forth in claim 7 wherein said Internet protocol push message comprises one of: an identification of a base station controller, an identification of a base transceiver station, a mobile Internet protocol address, a Network Interface device, a System Identification Number, and a time stamp.

9. The apparatus as set forth in claim 7 wherein said Internet protocol push message comprises an updated Internet protocol push message that comprises a time stamp and one of: an identification of a new base station controller, an identification of a new base transceiver station, a new mobile Internet protocol address, a new Network Interface Device, and a new System Identification Number.

10. The apparatus as set forth in claim 6 wherein said apparatus is capable of avoiding triangulation delay when said first mobile station served by said first packet data service node sends data packets to a third mobile station served by said first packet data service node, wherein said first packet data service node is capable of determining from information received through an interface with other packet data service nodes that said first packet data service node is serving said third mobile station.

11. The apparatus as set forth in claim 10 where said first packet data service node sends said data packets from said first mobile station to said third mobile station without sending said data packets through an Internet protocol network.

12. For use in a telecommunications network comprising a plurality of packet data service nodes and a plurality of mobile stations, wherein each packet data service node in said plurality of packet data service nodes is capable of communicating with at least one mobile station, an apparatus for avoiding triangulation delay when a first mobile station sends data packets to a second mobile station, said apparatus comprising:

a data base coupled to each of said plurality of packet data service nodes, said data base capable of sending data packets from a first packet data server node that serves said first mobile station to a second packet data server node that serves said second mobile station, said data base further capable of sending an Internet protocol push message comprising information concerning said second mobile station from said second packet data server node to said first packet data service node.

13. The apparatus as set forth in claim 12 further comprising an Internet protocol network coupled to said data base.

14. The apparatus as set forth in claim 13 wherein said apparatus is capable of avoiding triangulation delay when said first mobile station served by said first packet data service node sends data packets to said second mobile station that is served by said second packet data service node, wherein said data base is capable of causing said first packet data service node to send said data packets from said first mobile station to said second mobile station without sending said data packets through said Internet protocol network.

15. The apparatus as set forth in claim 12 wherein said data base is capable of identifying which packet data service node in said telecommunications network serves said second mobile station.

16. A method for avoiding triangulation delay in a telecommunications network comprising a plurality of packet data service nodes and a plurality of mobile stations, wherein each packet data service node in said plurality of packet data service nodes is capable of communicating with at least one mobile station, and wherein a first mobile station sends data packets to a second mobile station, said method comprising the steps of:

coupling an interface to a first packet data service node that serves said first mobile station and to a second packet data service node that serves said second mobile station; and sending an Internet protocol push message comprising information concerning said second mobile station through said interface from said second packet data service node to said first packet data service node.

17. The method as set forth in claim 16 wherein said Internet protocol push message comprises one of: an identification of a base station controller, an identification of a base transceiver station, a mobile Internet protocol address, a Network Interface device, a System Identification Number, and a time stamp.

18. The method as set forth in claim 16 wherein said Internet protocol push message comprises an updated Internet protocol push message that comprises a time stamp and one of: an identification of a new base station controller, an identification of a new base transceiver station, a new mobile Internet protocol address, a new Network Interface Device, and a new System Identification Number.

19. A The method as set forth in claim 16 further comprising the step of:

sending data packets from said first packet data service node directly to said second packet data service node for delivery to said second mobile station based on information received from said second mobile packet data service node through said interface.

20. A The method as set forth in claim 19 further comprising the step of:

sending said data packets from said first packet data service node directly to said second packet data service node for delivery to said second mobile station without sending said data packets through an Internet protocol network.

21. The method as set forth in claim 16 further comprising the steps of:

coupling an interface to each packet data service node in said plurality of packet data service nodes with all other packet data service nodes in said plurality of packet data service nodes;

enabling each packet data service node to obtain information from all other packet data service nodes concerning mobile stations served by said packet data service nodes.

22. The method as set forth in claim 21 further comprising the step of:

enabling each packet data service node to send an Internet protocol push message to all other packet data server nodes.

23. The method as set forth in claim 22 wherein said Internet protocol push message comprises one of: an identification of a base station controller, an identification of a base transceiver station, a mobile Internet protocol address, a Network Interface device, a System Identification Number, and a time stamp.

24. The method as set forth in claim 22 wherein said Internet protocol push message comprises an updated Internet protocol push message that comprises a time stamp and one of: an identification of a new base station controller, an identification of a new base transceiver station, a new mobile Internet protocol address, a new Network Interface Device, and a new System Identification Number.

25. The method as set forth in claim 21 further comprising the steps of:

determining in said first packet data service node from information received through said interface with other packet data service nodes that said first packet data service node serves a third mobile station as well as said first mobile station; and sending data packets from said first mobile station that is served by said first packet data service node to said third mobile station that is served by said first packet data service node.

26. The method as set forth in claim 25 further comprising the step of:

sending said data packets from said first mobile station to said third mobile station without sending said data packets through an Internet protocol network.

* * * * *